United States Patent [19]
Webster

[11] 3,875,799
[45] Apr. 8, 1975

[54] DEVICES FOR SENSING THE TEMPERATURE OF A MOVING WEB

[75] Inventor: Ernest Hoyland Webster, Yorkshire, England

[73] Assignee: WIRA, Leeds, England

[22] Filed: Aug. 21, 1972

[21] Appl. No.: 282,490

[30] Foreign Application Priority Data
Aug. 24, 1971 United Kingdom............... 39745/71

[52] U.S. Cl..................... 73/343 R; 73/77; 73/359; 73/362.8
[51] Int. Cl. .... G01k 1/16; G01k 7/00; G01k 13/06
[58] Field of Search............ 73/77, 351, 355 R, 359, 73/362.8, 343 R

[56] References Cited
UNITED STATES PATENTS

| | | | |
|---|---|---|---|
| 1,746,937 | 2/1930 | Harvey | 73/77 |
| 3,178,112 | 4/1965 | Rudd | 73/359 X |
| 3,279,956 | 10/1966 | Ekstrom | 73/351 X |
| 3,357,249 | 12/1967 | Bernous et al. | 73/351 |
| 3,427,882 | 2/1969 | Wagner | 73/351 |
| 3,690,176 | 9/1972 | Connolly et al. | 73/351 |
| 3,715,923 | 2/1973 | Hornbaker et al. | 73/359 X |
| R17,049 | 7/1928 | Witham | 73/77 |

Primary Examiner—Richard C. Queisser
Assistant Examiner—Frederick Shoon
Attorney, Agent, or Firm—Wolf, Greenfield & Sacks

[57] ABSTRACT

A temperature sensitive device monitors the temperature of a moving web, such as a cloth sheet, by utilizing a thin metallic leaf whose face rides upon the web's surface. The leaf is mounted upon a support from which the leaf is thermally isolated and a thermocouple or thermistor is in thermal contact with the rear of the leaf. Where the device is used to determine the moisture content of the web, a second temperature sensitive element is employed to sense the web bulb temperature of the surrounding atmosphere whilst the other temperature sensitive element senses the web's temperature. The two temperatures thus obtained enable the moisture content of the web to be ascertained.

2 Claims, 5 Drawing Figures

PATENTED APR 8 1975  3,875,799

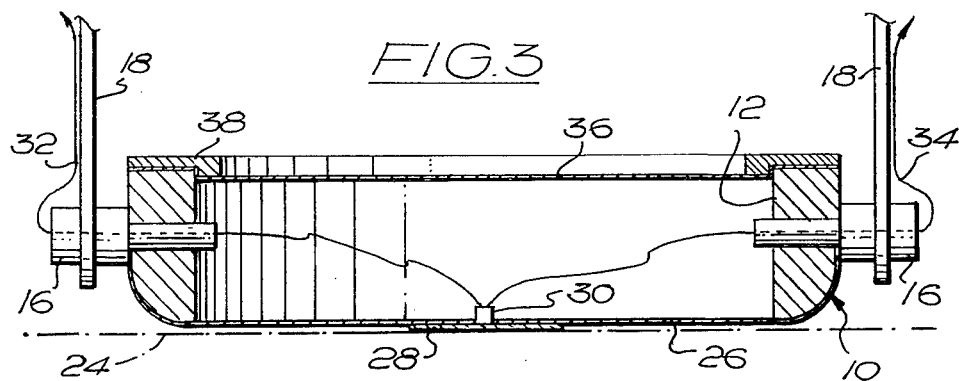
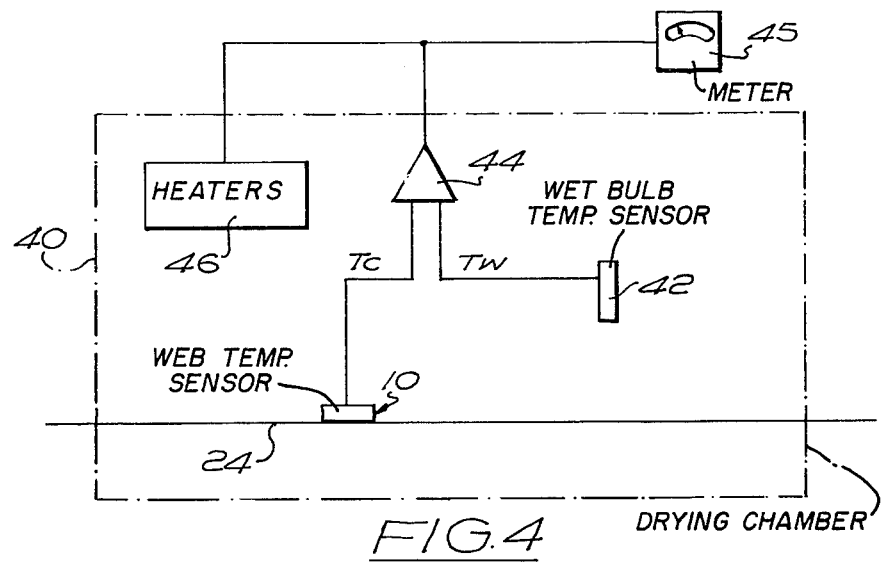
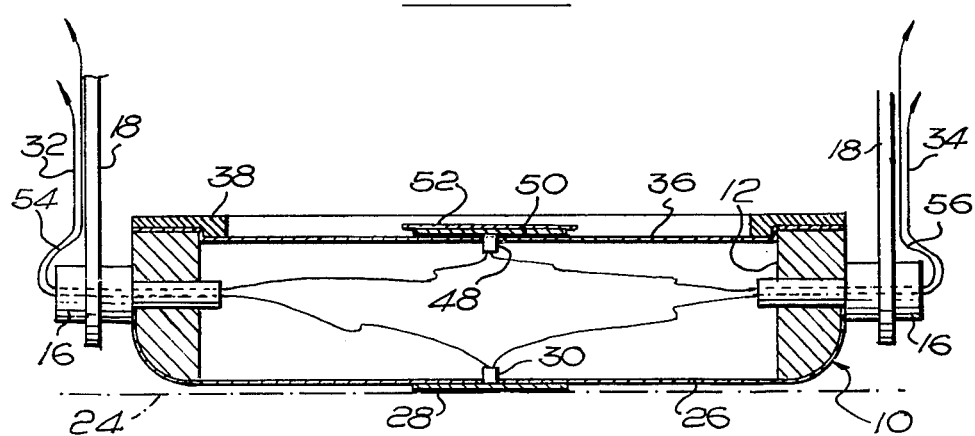

DEVICES FOR SENSING THE TEMPERATURE OF A MOVING WEB

This invention relates to a device for sensing the temperature of a moving web which may be for example, a fibrous textile web, and also to a method of measuring and/or controlling the moisture content of the web using the device according to the invention.

Many devices are known for measuring the temperature of a moving web set as a textile fabric, and the devices may or may not involve contact with the fabric. In the latter case, radiation pyrometers are generally employed; for some applications these are too expensive and elaborate and in some cases cannot be placed in the immediate environment of the material whose temperature is being measured.

On the other hand, devices which are brought into direct contact with the moving web, although in principle simple, have a rubbing action which may be undesirable, not only because of frictional heating effects but also because of physical damage to the web. In addition, a particular difficulty arises with contact devices in various cases where the web is at a different temperature from the environment that surrounds it. One such particular case is that of a textile or other fabric web from which moisture is evaporating e.g. as in a drying chamber. In this case, the problem is to ensure that the device in contact with the web is in no way influenced by that of the atmosphere. One of the reasons for ensuring that the temperature sensed by the device should not be influenced by the surrounding atmosphere is that in moisture content determination, it is important that the web temperature be known or detected accurately.

This invention, at least in its preferred form, aims at providing a device for sensing the temperature of a moving web which is being dried in a drying chamber and from which moisture is evaporating.

According to the present invention there is provided a device for sensing the temperature of a moving web comprising a support on which is suspended a thin metallic leaf of low thermal capacity in such a manner that the leaf is thermally isolated from the support and one surface of the leaf can be brought into contact with the moving web, and including a web temperature sensitive element located at and thermally connected to the other side of the leaf so as to sense the temperature thereof, the device being constructed so that the temperature sensitive element is thermally shielded from the surrounding atmosphere when the device is in use with the metallic leaf in contact with the web.

By having a contact leaf of low thermal capacity the device will have a fast response time and by thermally shielding the leaf from the atmosphere in which the device may be located, the device is protected from spurious operation when the temperature of such atmosphere is higher than that of the web, as would be the case in a web drying chamber. The accuracy of temperature sensing of the device is of significant advantage when it is being used in the determination and/or control of moisture content in the web.

The device is preferably for contacting the web under the action of gravity when the web is travelling in a horizontal path, and because of this, it is desired that the device be as light as possible. It may be pivotally mounted on carrying arms for pivotal movement about a first axis which lies parallel to the plane of the web where the device makes contact therewith and the arms themselves are preferably adapted to be mounted for pivotal movement about a second axis parallel to the first axis. In using such a device, it would preferably be mounted with the second pivot axis above and to one side relative to the first pivot axis.

The support of the device may be in the form of a ring with the leaf suspended by a fabric or wires on one side of the ring and located centrally thereof. The temperature sensitive element is located inside the ring and a heat shield is mounted at the other side of the ring whereby a thermally shielded cavity inside the ring and containing the temperature sensitive element is formed.

The leaf is preferably in the form of a metal foil disc which is suspended on the ring by means of a textile fabric, the lower conductivity of which serves to isolate thermally the disc from the ring.

The heat shield may be a metal foil screen which may be polished.

The first pivot axis is preferably arranged to lie parallel with but spaced from a diameter of the ring so that if the device is not in contact with a moving web, the ring will hang in a vertical plane with the disc facing in the direction from whence the web travels. By pivotally mounting the arms, the device can move up and down bodily to accommodate any irregularities in the web thickness or its vertical position.

The temperature sensitive element may be a thermocouple, thermistor or resistance thermometer or other temperature sensing means with appropriate electrical connections leading therefrom so that information as to the web temperature can be obtained. The information obtained may be used to control automatically other operations on the web if the temperature of the web is not say within predetermined limits. Thus, if the device is used in the web moisture content determination and/or control, the information may be processed with other information representative of the wet bulb temperature of the surrounding atmosphere.

In a modification, there may be provision for continuous withdrawal of air from within the ring causing inflow of air into the ring through the porous or perforated suspension fabric and the leaf of the latter is perforated. In another alternative, the ring could be filled with heat insulating material such as synthetic fibre filling.

The device of the invention is suitable for use in a drying tenter or a heat-setting oven.

In yet a further modification the device could carry a second temperature sensitive element for sensing the wet bulb temperature of the surrounding atmosphere so that the sensed cloth and wet bulb temperatures can be used for determining and/or controlling the moisture content of the web.

In relation to web moisture content determination and/or control, the present invention further provides a method of determining and/or controlling the moisture content of a moving web wherein the temperature of the web is sensed by a device as aforesaid and the wet bulb temperature of the surrounding atmosphere is also sensed, and the sensed web and wet bulb temperatures are processed to determine and/or control the moisture content of the cloth.

The said processing involves subtracting the wet bulb and web temperatures and electrically this can be affected easily by established method. Where a resulting electrical signal is produced which is representative of the moisture content of the web, this can be fed to a suitable electrical instrument if it is desired to have a reading of the moisture content or it can be used to control the rate or amount of drying of the web in order to keep automatically the moisture content of the web within prescribed limits.

Embodiment of the present invention will now be described, by way of example, with reference to the accompanying drawings, wherein;

FIG. 3 is a sectional elevation taken on line III—III of FIG. 2.

FIG. 4 is a schematic diagram illustrating the use of the device in web moisture content determination and/or control; and FIG. 5 is a sectional elevation similar to FIG. 3, but showing an alternative embodiment of the invention.

Figure 1:
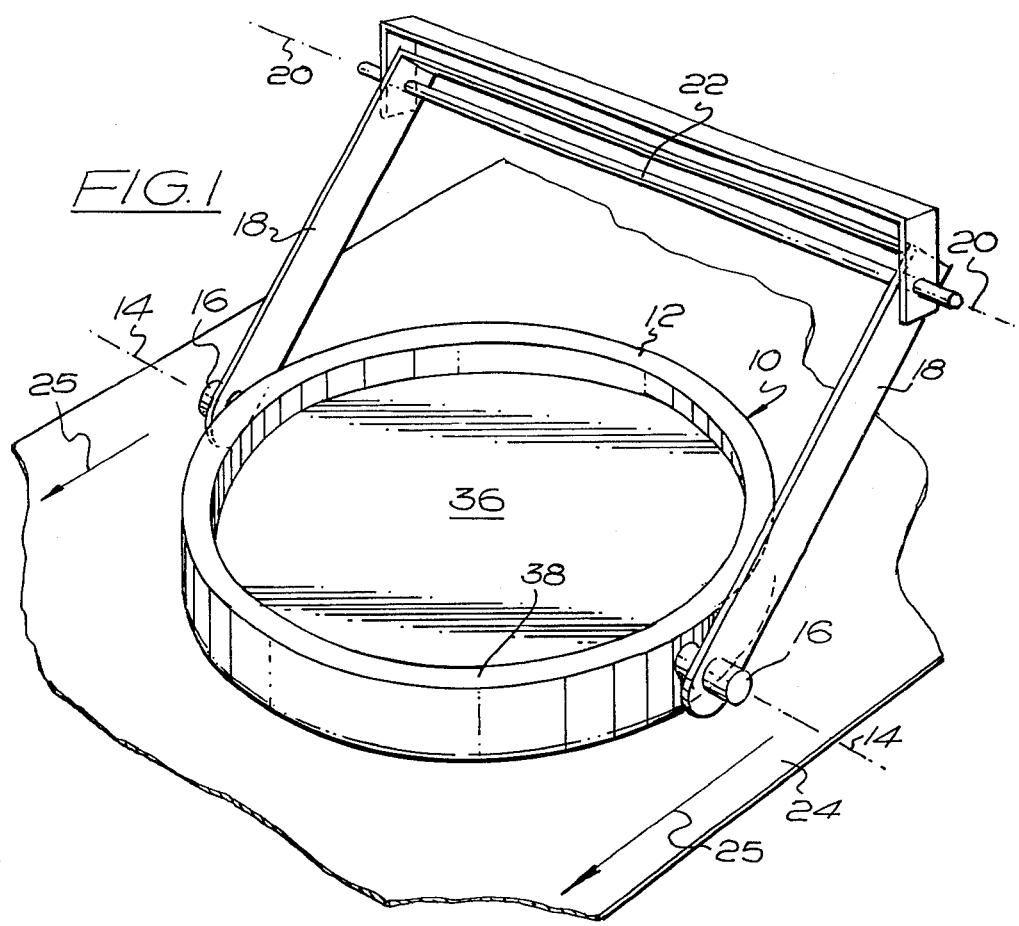
FIG. 1 is a perspective view of a device according to a first embodiment of the invention when in position for sensing the temperature of a moving web.

Referring firstly to FIG. 1, the device according to this embodiment of the invention is indicated by numeral 10 and will be seen to comprise a circular ring support 12 which is carried for pivotal movement about a horizontal axis 14 (defined by a pair of trunnions 16) by a pair of arms 18, said arms themselves being mounted for pivotal movement about another horizontal axis 20 defined by axle rod 22. Axes 14 and 22 are parallel and in the in use position shown, axis 22 is above and to one side of axis 14 so that the fabric web 24 whose temperature is to be sensed can pass as indicated by arrows 25 under the axis 22 and allow the device 10 to rest on the fabric as shown. It should be pointed out that FIG. 1 is not to scale, but rather the device 10 and its mounting have been shown greatly enlarged in relation to the web 24, in the interests of clarity. Also rod 22 will be supported for example directly or through fittings on the walls of a drying chamber or heat setting oven.

Figure 2:
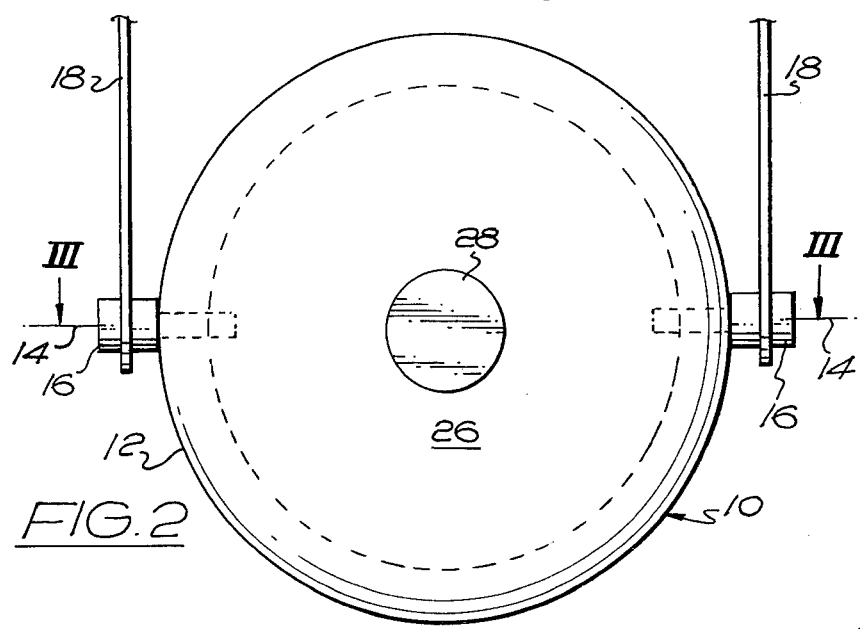
FIG. 2 is an underneath plan view of the device of FIG. 1.

Referring now to FIGS. 2 and 3, stretched across the lower side of ring 12 is an open mesh suspension fabric 26 by which a thin metallic foil disc 28 is suspended on ring 12, this disc being located centrally of ring 12 and on the outside of fabric 26 relative to ring 12 so that the disc 28 in use contacts web 24. The fabric 26 is constructed of thermally insulating synthetic fibrous material and this serves to isolate thermally the disc 28 from ring 12.

On the rear side of disc 28 is mounted a temperature sensitive element 30 so as to be in thermal communication with disc 28, and lead wires 32, 34 from the element 30 lead through trunnions 16 respectively to suitable instrumentation.

The disc 28 is of low thermal capacity so that the device will have a fast response time.

At the top side of ring 12 is a heat shield in the form of an aluminium screen 36, this being held in position by a retaining ring 38. The screen 36 thermally shields the temperature sensitive element 30 from the environment in which the device is located and its outer surface may be highly polished to reflect radiant energy away from the device and its inner surface may be highly polished to give minimum emission in the direction of element 30.

By mounting the device 10 on the pivot arms 18, it can rise and fall with irregularities or variations in the thickness or vertical position of the web. The arms 18 may be counterbalanced by means of an adjustable counter-balance weight to ensure the minimum of pressure between the web 24 and device 10. The amount of pivoting of arms 18 which is possible may be restricted by suitable stops.

The axis 14 is parallel to a diameter of ring 12, but is slightly off centre so that in the absence of web 24 the device 10 hangs in a vertical plane with the disc 28 facing in a direction ready to meet the next length of web feed into co-operative relationship with the device in the direction of arrows 25.

The sensing device described may be used in conjunction with another temperature sensing device to determine the moisture content of a web which is being dried in a drying chamber. The device according to the invention would provide the web temperature and the other device the wet bulb temperature of the chamber.

Thus, in FIG. 4 there is shown an arrangement for determining and/or controlling the moisture content of the web 24 as it passes through a drying chamber or heat setting oven 40. The device is indicated as in FIGS. 1 to 3 by reference numeral 10 and the additional temperature sensing means for sensing the wet bulb temperature of the atmosphere in chamber or oven 40 is indicated at 42. Sensor 42 is electrical in nature and produces an output electrical signal representative of the wet bulb temperature $T_w$ whilst the device 10 as explained provides an output signal representative of the temperature $T_c$ of the web. These two signals are fed to an electrical processing unit 44 of conventional functions which processes the signal, involving the subtraction of the temperatures, to provide a resulting output signal representative of the moisture content of the web. This resulting output signal could be fed to a meter such as meter 45 for direct reading of the moisture content of the web or it could be fed to the heaters 46 of the oven or chamber 40 to control the rate or amount of heat applied to the web, if the moisture content is not within predetermined limits. Of course, the resulting output signal may be fed to both meter 45 and heaters 46. Instead of, or in addition to feeding the resulting output signal to the heaters 46, it can be used to control the speed of travel through the chamber or oven 40 of web 24 or the rate or amount of heat applied to the web in pre or post heating apparatus, either of which can control the moisture content of the web.

Still dealing with determination and/or control of moisture content in the web, FIG. 5 illustrates a second embodiment of the device according to the invention. Basically, this embodiment is identical in all respects with the embodiment illustrated in FIGS. 1 to 3, and accordingly similar reference numerals have been used for parts already described in relation to the FIGS. 1 to 3 embodiment but the FIG. 5 embodiment has an additional electrical temperature sensing element 48 located to the underside of heat shield 36, and on top of heat shield 36 is a second metal foil disc 50 which is thermally isolated from shield 36, e.g. by a heat insulating washer and with which the element 48 is in thermal contact through an aperture in shield 36. A piece of wet fabric 52 covers disc 50 so that this disc will be maintained at the wet bulb temperature of the surrounding atmosphere and temperature sensing element 48 will sense such wet bulb temperature and produce an appropriate electrical output signal. The leads 54 and 56 from element 48 also lead through trunnions 16 as shown.

When the device according to the embodiment of FIG. 5 is used in the arrangement of FIG. 4, the separate wet bulb sensing means 42 is not of course required, the two elements 30 and 48 respective supplying electrical outputs representative of the web and wet bulb temperatures directly to unit 44.

I claim:
1. In apparatus for sensing the temperature of a moving web, the apparatus being of the type having
   A. a support frame,
   B. a web temperature sensing element mounted on the support frame for sliding contact with the moving web, and
   C. means associated with the web temperature sensing element for providing electrical signals indicative of the web's temperature,
the improvement wherein
   1. the web temperature sensing element is a thin metallic leaf of low thermal capacity, and
   2. a suspension fabric is attached to the support frame and carries the metallic leaf in thermal isolation from the frame, the suspension fabric and the front face of the leaf providing a substantially planar surface for riding upon the surface of the moving web.

2. The improved apparatus according to claim 1, the improvement further including
   3. a heat shield for shielding the metallic leaf, the heat shield being a polished metal plate carried by the support frame in a plane parallel to and spaced from the plane of the metal leaf.

* * * * *